June 29, 1926.
R. H. DIECKHOFF ET AL
1,590,349
LIGHTING DEVICE FOR KEROSENE STOVES
Filed Dec. 5, 1923
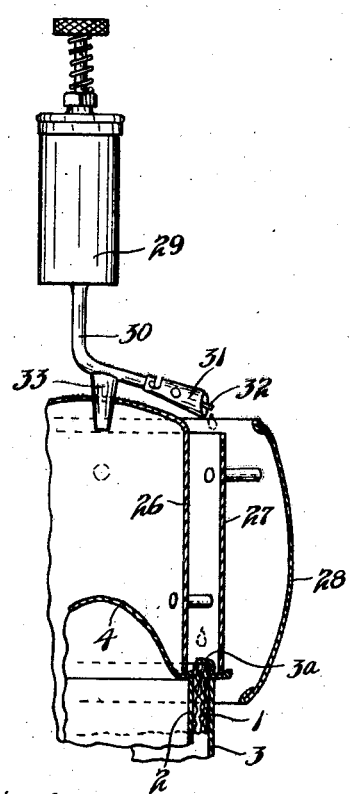
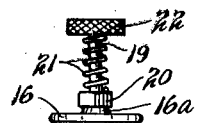
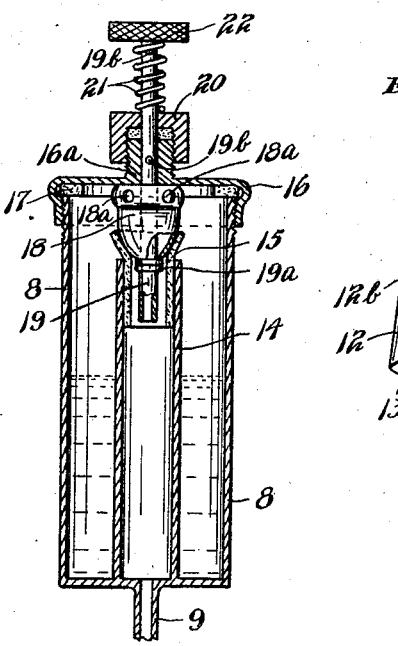
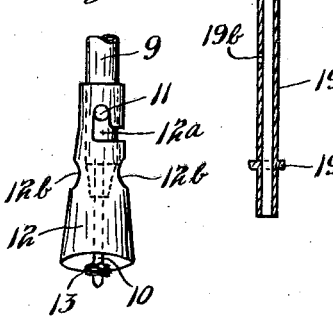
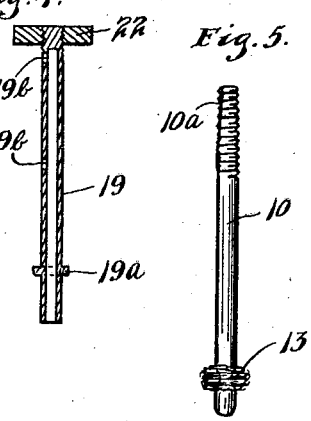
INVENTORS.
RUDOLPH H. DIECKHOFF.
EMIL C. DIECKHOFF.
BY THEIR ATTORNEY.
James F. Williamson Patented June 29, 1926.

1,590,349

UNITED STATES PATENT OFFICE.

RUDOLPH H. DIECKHOFF AND EMIL C. DIECKHOFF, OF MINNEAPOLIS, MINNESOTA; SAID EMIL C. DIECKHOFF ASSIGNOR TO FRANCES DIECKHOFF, OF MINNEAPOLIS, MINNESOTA.

LIGHTING DEVICE FOR KEROSENE STOVES.

Application filed December 5, 1923. Serial No. 678,601.

This invention relates to a liquid fuel burning stove and particularly to a kerosene stove for heating purposes and a lighting device therefor. Kerosene stoves, particularly stoves for cooking purposes are now manufactured and sold in immense numbers and are extensively used both in cities where gas and gasoline are available as well as in outlying communities where gas is not available. One serious objection to the modern kerosene stove is that it takes quite a while for the flame to reach full proportions. It also takes quite a while to light the wick used on most of said stoves. Furthermore, such stoves are commonly provided with a burner in the form of a hood extending over and around an annular wick. This hood is raised to light the wick, and when the wick is burning with the hood raised there is considerable smoke and odor created. This is objectionable and is one disadvantage of such a stove.

It is an object of this invention to provide a lighting device in combination with the burner of a kerosene stove by which the wick can be quickly lighted throughout its entire extent.

It is also an object of the invention to provide such a lighting device which can be applied to the stove to light the wick without raising the hood, thus eliminating the objectionable smoke and odor produced when the hood is raised in the lighting operation.

It is a further object of the invention to provide a lighting device comprising a casing adapted to contain alcohol or other suitable combustible fluid, which casing has means for supporting the same from the oil burner, and means for dropping lighted liquid into said burner adjacent the wick.

It is another object of the invention to provide such a lighting device comprising a casing having means therein for measuring off a certain quantity of the combustible liquid and means for then dispensing said liquid in regulated quantities, together with a means for dropping said liquid after the same is lighted, said latter means preferably being enclosed by a protecting hood.

It is still a further object of the invention to provide such a lighting device having means for dropping the lighted liquid, which means has thereon another means for retaining the liquid and flame.

It is also an object of the invention to provide a lighting device suitable for different types of burners and burners of different sizes.

These and other objects and advantages of the invention will be fully set forth in the following description made in connection with the accompanying drawings in which like reference characters refer to the same parts throughout the different views, and in which, Fig. 1 is a view in side elevation of the invention showing the same applied to an oil burner which is shown in vertical section;

Fig. 2 is a view in vertical section of the upper portion of the lighting device;

Fig. 3 is a view in side elevation of the lower end of the lighting device;

Fig. 4 is a view in vertical section of the regulating valve element used;

Fig. 5 is a view in side elevation of the liquid distributor; and

Fig. 6 is a view similar to Fig. 1 showing a modified form of the invention used with a different type of burner.

Referring to the drawings, in Fig. 1 is shown one common commercial type of burner for a kerosene stove, said particular type being a well known commercial stove. The said burner is illustrated as comprising an annular wick 1 which is vertically movable between a central wick tube 2 and an outer wick tube 3 by an adjustable or regulating means (not shown). The tube 2, at its upper end, has an inwardly extending flange formed into a groove in the center of which rises a perforated cone 4 and a central cylindrical member or combustion tube 5 of the burner hood rests in said groove at the base of the cone 4. The tube 3 has an outwardly extending ledge or flange with a short vertical lip extending therearound, which surrounds a shell or combustion tube 6 also forming part of the burner hood and which is secured to member 5. The tube 3 is also usually provided at its upper end with a plurality of spaced tabs 3ª of narrow width which extend over and form stops for the top of the wick 1. It will be noted that the members 5 and 6 are flared outwardly immediately above their supporting lower ends so that they form an annular passage therebetween of greater diameter than the diameter of the wick. The outer shell 7 extends about and is secured to the shell 6. The top of the central member 5 is closed but is provided with a central aperture in its closed upper portion. The lighting device designated generally as A comprises a casing 8 illustrated as of cylindrical form and a dispensing means or tube 9 which extends from the bottom of the casing and is offset and provided with a depending portion shown in Fig. 1 as disposed in the passage between members 5 and 6. The lower end of the tube 9 is interiorly threaded and adapted to receive therein the upper threaded end of a stem 10, which threaded end is flattened at one side, as shown at 10ª, so that the same can be screwed more or less into the end of said tube to form a regulating means for the outlet of the fluid. The lower end of said tube is also provided with a pin 11 and a hood member 12 of thin sheet metal and of open-ended flaring form, at its lower end, has a bayonet joint groove 12ª formed therein adapted to co-operate with the pin 11. The said hood 12, at its upper end, fits around the tube 9 and is thus detachably held thereon by means of said bayonet joint. The said hood is preferably provided at opposite sides thereof with suitable openings 12ᵇ. The stem 10 forms a distributing or dropping member for lighted fuel and the same is provided with means for retaining liquid and lighted liquid thereon, comprising a member 13 preferably formed of fine wire gauze wadded or pressed about the stem 10 so as frictionally to be held thereon. The casing 8 is shown as having a sleeve 14 projecting centrally and upwardly therein which forms, with the wall of said casing, an annular chamber. Said sleeve 14 is open at its upper end and receives a sleeve 15 preferably of soft yielding material, which sleeve has a flaring upper end. The top of casing 8 is provided with a removable screw cap 16 having suitable closing gasket 17 to which top is secured a hollow member 18 forming a receptacle having a tapering curved lower end adapted to fit closely in the upper end of sleeve 15. The member 18 is provided with a plurality of apertures 18ª at its upper portion and has an aperture at its lower portion normally closed by a gasket washer carried on a shoulder 19ª formed on an alining stem 19. The stem 19 projects through the member 18, cap 16 and an exteriorly threaded projection 16ª on the latter as well as through a packing shell 20 threaded on said projection 16ª, and said stem is provided with spaced holes 19ᵇ extending into the interior thereof. Said stem is closed at its upper end and provided with a suitable knurled operating head or knob 22. Suitable packing material is inserted in the shell 20 above projection 16ª to prevent a leakage of liquid in casing 8 around the stem 19. The stem 19 is normally elevated and the opening in the bottom of receptacle 18 normally closed by the coiled compression spring 21 disposed between members 20 and 22 and surrounding the stem 19.

The burners or hoods comprising the members 5, 6 and 7 are made, usually of two different sizes and the casing 8 is thus provided with a supporting means comprising a rod 23 having a threaded lower end receiving a frusto-conical plug 24 adapted to seat in the opening in the top of member 5. Said rod is provided with a coiled or helical portion 25, the axis of which is offset from the axis of its lower end and the rod is then bent up along the side of casing 8. The rod 23 can thus be rotated through 180 degrees to increase the distance between the center of its lower end and the center of the depending lower end of tube 9 so that the support can be used with either a large or a small burner.

In operation, the lighting device A will contain some suitable combustible liquid, preferably alcohol, in its casing 8. When the stove is to be lighted, the lighting device will be grasped and held in an inverted position. The liquid will then run into and fill the receptacle 18. The device is now held with the hood 12 downward and the knob or head 22 is pressed downwardly with the thumb or finger and the alcohol runs from the receptacle 18 into tube 9 and issues in a small quantity from the end of said tube onto the stem 10. The liquid encounters and covers the gauze 13. A match is now applied to the alcohol and the lighting device is placed on the burner, as shown in Fig. 1. The alcohol from the receptacle 18 has now all been discharged in the sleeve 14 and will continue to run down onto the stem 10 and to drop therefrom. The drops which fall from the end of the stem 10 are ignited and, owing to the gauze 13, a quantity of liquid is retained on the stem 10 in ignited condition. The lighting device is now rotated about its supporting member 24 so that its lower end swings around in the passage between members 5 and 6. Flame is thus dropped onto or adjacent the wick at practically all points thereof so that the wick is practically instantaneously lighted. The burning alcohol quickly heats the wick and adjacent parts so that the maximum flame of the burner is speedily attained. In the ordinary way of lighting the burner, a match is applied at one or two places about the wick and the flame crawls very slowly around the wick, being impeded at each of the stop members 3ª. The flame does not pass beyond each stop member until said member has become considerably heated. Even after the flame has thus slowly traversed around the wick it is a considerable time until the flame reaches its full proportions. The parts about the wick must be considerably heated so as to hasten the vaporization of the fuel. When the lighting device is used as above stated, this heating is quickly accomplished by the burning alcohol dropped upon the parts so that the full flame is rapidly attained. It will be noted that when knob 22 is depressed, air can reach the inside of the receptacle 18 to allow the liquid to flow therefrom by passing through the holes 19ᵇ. It is necessary to protect the lower end of tube 9 from being heated, for if this tube becomes heated, the alcohol will cease to flow out of the same as a liquid but will be vaporized and will blow out of the tube so that it will be impossible to have the free and ignited drops fall from the stem 10. To prevent such heating of the end of the tube, the hood 12 is provided and said hood is provided with the holes 12ᵇ for the admission of air to support the combustion of the alcohol. The lighting device can readily be removed and the same can readily be filled by taking off the cap 16. When once filled, enough liquid will be contained therein for a large number of lightings and the amount of liquid charge taken into the receptacle 18 in each lighting is just about sufficient to efficiently light the wick. As above stated, it is the common practice to have two sizes of burners and when the larger size is used the supporting rod 23 will be rotated through substantially 180 degrees so that the lighting device will then fit the larger burner. The amount of flow of the alcohol from the sleeve 14 can be nicely and very accurately and finely regulated by screwing the stem 10 in or out of the lower end of tube 9. The member 13 can, if desired, be disposed at various points along the stem 10.

It will, of course, be seen that only the alcohol which was taken into the receptacle 18 will run in the tube 9 and be discharged in the lighting operation. When such amount has been discharged no more alcohol will be dispensed until the lighting device is again inverted and the knob 22 again pressed inwardly.

In Fig. 6, a slightly different form of burner is illustrated which, however, has the parts 2, 3, 3ª and 4 similar to the parts shown in Fig. 1. The inside or central member 26 of the burner and the outer shell 27 thereof, however, have straight sides and do not have the flaring structure immediately above the wick. The outer shell 28 is, in all respects, similar to the shell 7 already described. With such a burner, the lighting device used will have a casing 29 similar in all respects to the casing 8 and will have its contained parts similar to those already described for the casing 8. The tube 30, however, may have a rigid conical support 33 secured thereto adapted to seat in the central opening of the member 26 and said tube 30 will have a stem similar to the stem 10 screwed therein with a part similar to the part 13 thereon. The said tube will also have a hood 31 secured thereto by the usual bayonet joint, which hood is quite similar to hood 12, the hood 31, however, having its flaring open end disposed somewhat inclined to the axis of the hood. The tube 30 is of such length and the stem 32 similar to the stem 10 is so arranged that the lighted drops of alcohol will drop vertically through the passage between members 26 and 27 onto the wick 1. The wick will thus be lighted in the same manner as the wick 1 in Fig. 1, already described, it being understood that the lighting device is rotatable about the supporting member 33. As the wick 1 is lighted there is quite a current of gas up through the passage between members 26 and 27, a large part of which will not support combustion and which would tend to extinguish the lighted liquid on the stem 32 and the gauze thereon. The hood 31 thus protects the flame from being extinguished by this draft and the holes in the hood admit air to sustain the combustion. The hood 31 also, like the hood 12, protects the end of tube 30 from being heated. It will thus be seen that the operation of the device shown in Fig. 6 is quite similar to that shown in Fig. 1.

From the above description it is seen that applicant has provided an extremely simple and very efficient lighting device for a kerosene stove and a device which will have a high degree of utility. The stove is quickly lighted and the flame quickly brought to its maximum intensity. With the ordinary commercial stove, and with the usual method of lighting the wick by a match, it takes from seven to fifteen minutes for the wick to become completely lighted and for the flame to obtain its maximum proportions. With the lighting device, the lighting of the wick is done almost instantaneously and the flame reaches its full proportions in about four minutes, or less. Furthermore, the lighting is all done without removing the burner hood so that there is no smoking of the wick and no generation of objectionable odors. The lighting device is easily and quickly operated and is entirely safe. The device is applicable to practically all standard makes of kerosene stoves, commercially made at the present time. The lighting device is quite simple and inexpensive and can be quite easily and inexpensively made. The device has been amply demonstrated in actual practice and found to be very successful for the purposes intended.

It will, of course, be understood, that various changes may be made in the form, details, arrangement and proportions of the parts without departing from the scope of applicant's invention, which, generally stated, consists in a device capable of carrying out the objects above stated, such as shown and described and set forth in the appended claims.

What is claimed is:

1. In combination with a burner having a wick, a lighting device supported by and movable on said burner, and having a lighting portion movable above said wick in a path substantially vertically alined with the top surface of said wick to light the same.

2. In combination with a burner having a central cylindrical portion and a wick surrounding said central portion, a lighting device supported on said central portion and rotatable about the central axis thereof and having a lighting means movable over the exposed surface of said wick in a path conforming to the top of said exposed portion.

3. The combination with a burner having a combustion tube, a tube surrounding the same forming an annular passage, and inner and outer wick tubes forming an annular passage vertically alined with the bottom of said first mentioned passage and adapted to receive a wick, of a lighting device supported on said first mentioned combustion tube and having a lighting portion disposed in said first mentioned passage and revoluble to travel therein above said wick.

4. The combination with a burner adapted to carry a wick therein, of a lighting device comprising a casing, means thereon for supporting the same from the top of a burner for rotating movement thereon, a tube connected to said casing and depending above the wick of said burner, and means at the end of said tube for dropping ignited liquid into said burner to ignite said wick.

5. A lighting device for an oil burner having in combination, a casing adapted to contain a combustible liquid, a dispensing means depending from said casing, means connected to said dispensing means for dropping ignited liquid therefrom, means on said latter means for retaining ignited fuel thereon, and means for protecting said latter means and preventing heating of said dispensing means.

6. A lighting device for an oil burner comprising a casing adapted to contain a combustible liquid, a dispensing nozzle secured to said casing, a stem secured to said nozzle, a fuel and flame retaining means on said stem, and a hood secured to said nozzle and surrounding said stem.

7. The combination with an oil burner of a lighting device having in combination, a casing, means for supporting the same from said oil burner for rotating movement thereon, dispensing means connected to said casing depending at one side of said burner for dropping lighted fuel into said burner, said supporting means being eccentric to said casing and being rotatable relatively thereto, whereby said dispensing means can be positioned at different radial distances from the central axis of said casing.

8. The combination with an oil burner having a wick, of a lighting device movable relatively to said burner and having supporting means adapted to be supported on said burner, and means for dropping ignited liquid into said burner onto said wick to ignite said wick.

9. The combination with an oil burner having a wick, of a lighting device supported on said burner and movable relatively thereto comprising a casing adapted to contain a combustible liquid, a manually operated means for controlling the discharge of said liquid, and means for dropping ignited portions of said liquid into said burner on to said wick to ignite said wick.

10. The combination with an oil burner having an annular wick, of a lighting device supported by and movable on said burner, said lighting device having a depending portion movable in a path substantially vertically alined with said wick and adapted to light the same.

In testimony whereof we affix our signatures.

EMIL C. DIECKHOFF.
RUDOLPH H. DIECKHOFF.